UNITED STATES PATENT OFFICE.

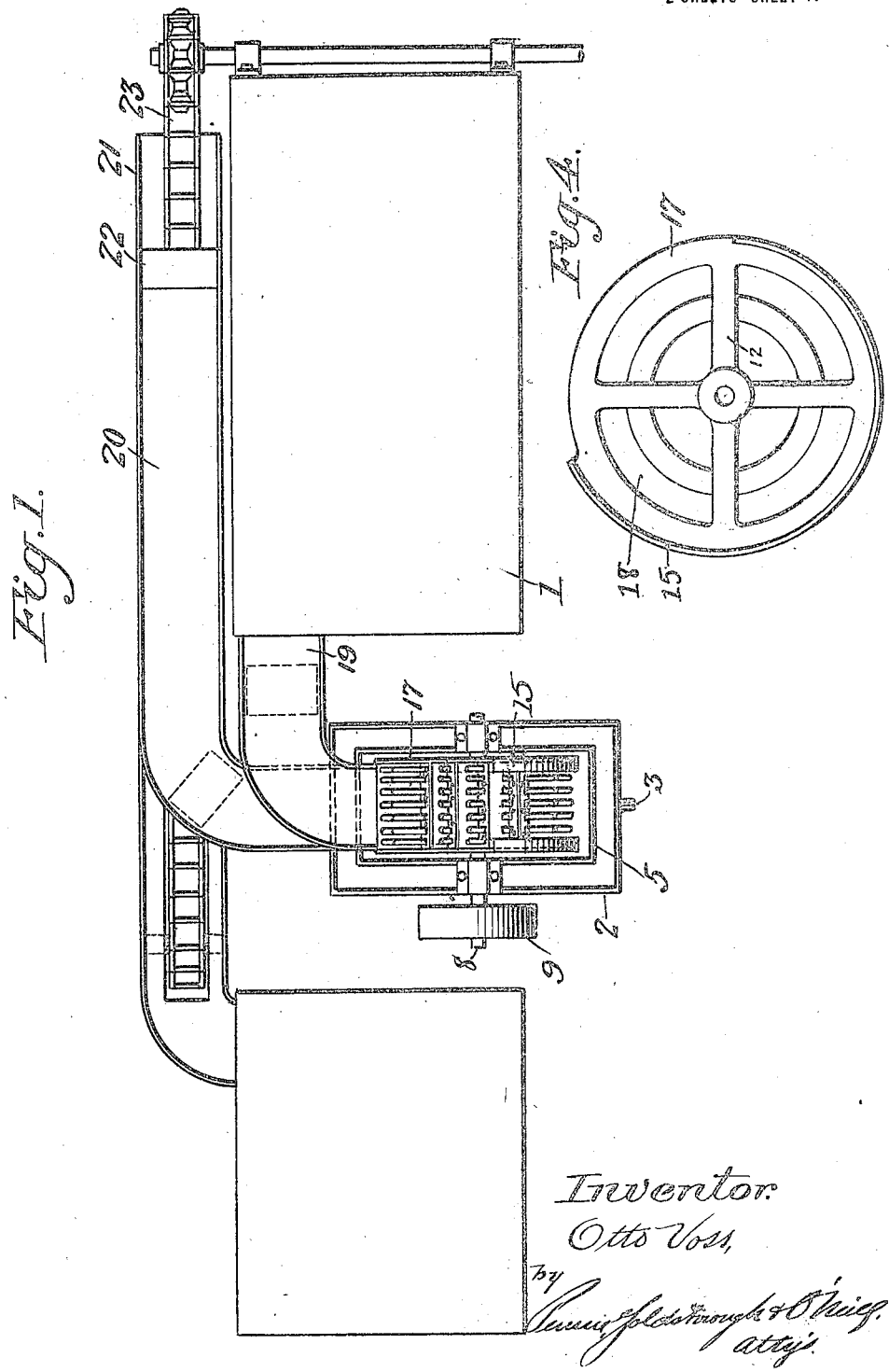

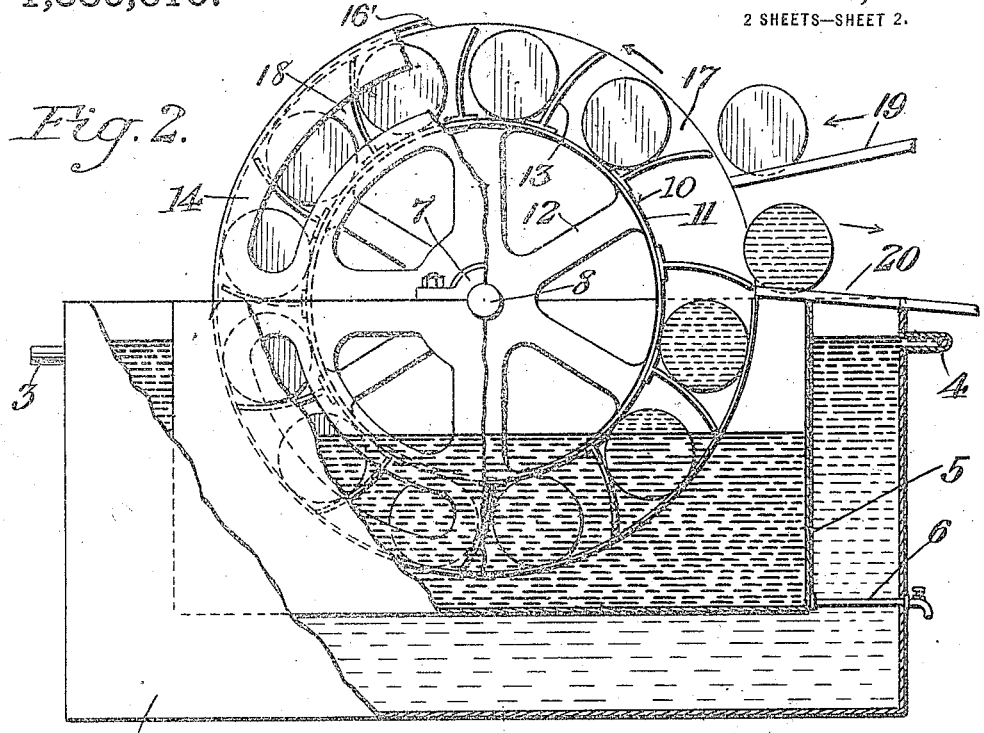
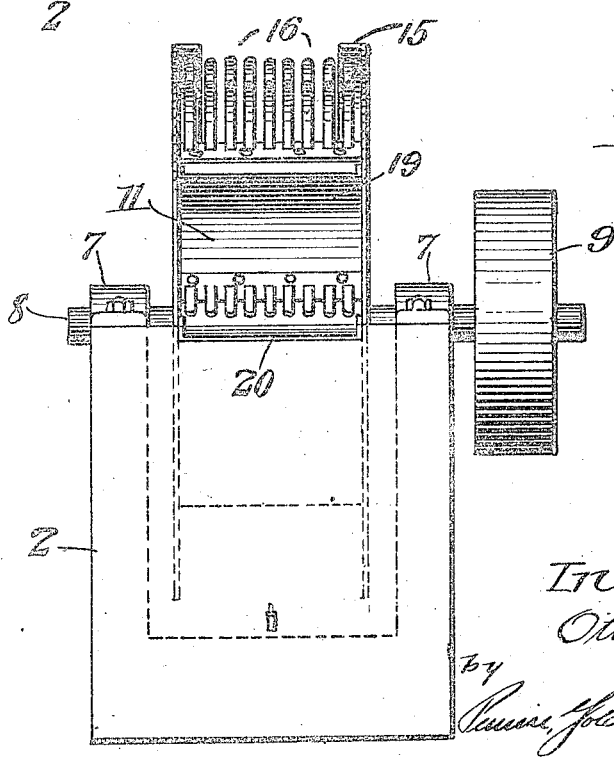

OTTO VOSS, OF HONOLULU, TERRITORY OF HAWAII, ASSIGNOR TO HAWAIIAN PINE-APPLE COMPANY, LIMITED, OF HONOLULU, TERRITORY OF HAWAII.

METHOD OF AND MACHINE FOR APPLYING A COATING TO CANS.

1,380,610.     Specification of Letters Patent.     Patented June 7, 1921.

Application filed September 21, 1918. Serial No. 255,109.

*To all whom it may concern:*

Be it known that I, OTTO VOSS, a citizen of the United States, residing in the city of Honolulu, county of Honolulu, in the Territory of Hawaii, have invented certain new and useful Improvements in Methods of and Machines for Applying a Coating to Cans; and I do hereby declare the following to be a full, clear, and exact description of the invention, such as will enable others skilled in the art to which it appertains to make and use the same.

This invention relates to the method of and machine for applying a coating to cans to preserve the contents thereof.

An object of the invention resides in the provision of a method wherein the coating is so applied to the can that the ingress of air into the can, after the application of the coating, will be prevented.

A further object of the invention resides in the provision of a machine for carrying out the above method with the greatest possible facility and at the minimum of expense.

With these and other objects in view, such as will appear as my description progresses, my invention comprises the combination and arrangement of parts and the method as set forth in and falling within the scope of the appended claims.

In the drawing, which illustrates a machine for carrying out the method above described:

Figure 1 is a plan view of the cooker, coating applying machine, cooler and connections between the same;

Fig. 2 is a side elevation, partly broken away, of the coating machine;

Fig. 3 is an end elevation of the same; and

Fig. 4 is an elevation of one cheek.

It has been found that in canning materials of many different properties, it is desirable, and as a matter of fact, essential in some cases, that the air be excluded from the contents of the cans to prevent deterioration of the same. For instance, in the canning of fruits it is essential that the air be excluded in order that the canned fruits may be preserved. I have actually tested the invention in the canning of pineapple and have found that the results are admirable, but I wish it to be understood that I do not consider the invention limited in its usefulness to the pineapple canning industry, as it obviously can be successfully employed in, not only the canning of food stuffs, but also in the canning of various materials. I will, however, describe the invention in connection with the canning of pineapple.

The method consists, broadly, of cooking the contents of the cans in any desirable form of cooker after the cans have been sealed. After the contents of the cans are thoroughly cooked the cans are immediately passed through a coating bath, of lacquer, for instance. The lacquer, is thus applied to the cans while the contents of the cans are still hot. The cans properly coated, are then cooled in any suitable manner, as for instance, by placing them in a cooler of the ordinary type. When the cans are hot the pressure therein is greater than atmospheric pressure. This excess pressure within the cans excludes the entrance of air into the cans through the minute holes which may exist. The coating is applied while the air is thus excluded from the cans. As the cans cool the internal pressure is gradually reduced until it is below atmospheric pressure and in fact until a partial vacuum is formed in the cans, the condition being as near a perfect vacuum as possible. The coating, of course, cools with the cans and becomes hardened, though not brittle. Where the atmospheric pressure exceeds that pressure which exists within the cans, the lacquer or other coating is forced into the minute holes which may be in the cans and thus hermetically seals the cans. In addition to the hermetic sealing of the cans, before any air can enter, another very advantageous result is attained by the practice of my invention, that is to say, the coating is prevented from entering the cans through the holes. Obviously this is true since the coating hardens by the time the pressure within the cans falls below the outside pressure. Thus two great causes for the spoiling of the contents of the cans is obviated. While in the above description I have referred to the outside pressure as atmospheric, it will, of course, be understood that the outside pressure may be artificially developed if desired.

The drawing illustrates a cooker 1, conventionally, which cooker may be of any type where the contents of the cans are cooked while the tops of the cans are sealed on. Arranged adjacent to the cooker, preferably in close proximity thereto, is a coating applying machine. This machine includes an outside water tank 2 into which water flows through a pipe 3, and from which it flows through a pipe 4. By controlling the temperature of the water in the tank 2, the temperature of the lacquer or other coating solution can be regulated and thus kept at any desired point.

A receptacle 5 is located in the tank 2 and is adapted to contain coating liquid, the liquid being placed therein from the top and drained therefrom, when desired, through the valved pipe 6.

Extending transversely of the receptacle and mounted in bearings 7, is a shaft 8 which is driven by suitable means, such as a belt pulley 9. A can carrying drum 10 is secured to the shaft 8 and is rotated thereby. This drum includes an annular element 11, which is carried by spokes 12 and includes, also, outwardly extending curved fingers 13, which are arranged in spaced series. The fingers curve away from the annular element 11 in a direction opposite to that in which the drum is rotated so that when the cans are fed to the drum and from the drum the cans will rest on the convex surfaces of the fingers.

A casing incloses the drums and comprises a pair of spaced circular cheeks 14, each of which has a peripheral flange 15, extending partly therearound. The combined widths of these flanges is less than the distance between the cheeks, so that a space 16 remains therebetween. Furthermore, these flanges are eccentric at 16′, so as to enable the can to enter the casing more easily. If a can is slightly out of place when it passes to one series of fingers, it will be passed to the proper position by the eccentric portions of the flanges 15. These flanges are not circular, but are rather major arcs, so that a space 17 is left, through which the cans can be fed to and from the drum. The cheeks are provided with openings 18 through which the coating solution passes to the cans. A runway 19 extends from the cooker 1 to the coating machine. I have illustrated this runway as of the gravity feed type, but it is obvious that a positive feed may be used so long as the cans enter the drum by gravity. A second runway 20 extends from the coating machine to a third runway 21 of the positive feed type, which latter runway extends to the cooler. The cans drop through an opening 22 in the runway 20 to a conveyer 23, by which they are carried along the runway 21.

In operation the cans are placed in the cooker 1 where the contents are cooked. The cans are immediately passed along the runway 19 to the coating machine where they pass on to the series of fingers on the carrying drum. This drum carries the cans through the coating solution, and when the cans reach the runway 20 they pass to the same, owing to the form of the fingers and the fact that the centrifugal force tends to throw them outwardly. During the passage of the cans through the coating solution they rotate because of the fact that they tend to float. The coating machine is located in close proximity to the cooker so that the cans enter the former at substantially the same temperature as when they leave the latter. From the coating machine the cans pass to the cooler, and the coating there thoroughly solidifies.

From the above description it will be seen that I have provided a method of and apparatus for coating cans so that the contents thereof will be preserved.

What I claim is:

1. The method of treating sealed cans of food stuffs, and the like, which consists in heating the cans to cook the contents and create a pressure within the cans in excess of the outside pressure, and applying a coating to the exterior of the cans during the continuance of the excess pressure within said cans.

2. The method of treating sealed cans of food stuffs, and the like, which consists in heating the cans to cook the contents and create a pressure within the cans in excess of the outside pressure, and applying a liquid coating to the exterior of the cans during the continuance of the excess pressure within said cans.

3. The method of treating sealed cans of food stuffs, and the like, which consists in heating the cans to cook the contents and create a pressure within the cans in excess of the outside pressure, applying a liquid coating to the exterior of the cans, and gradually reducing the pressure within the cans to a point below the outside pressure.

4. The method of treating sealed cans of food stuffs, and the like, which consists in heating the contents of the cans *in situ*, then applying a liquid coating to the exterior of the cans while the cans are hot, and thereafter cooling the cans.

5. The combination with a cooker for cooking the contents of sealed cans, of means connected with the cooker for applying a liquid coating to the exterior of the cans before the temperature of the cans is materially reduced.

6. The combination with a cooker for cooking the contents of sealed cans, means connected with the cooker for applying lacquer to the exterior of the cans before the temperature of the cans has been materially reduced, and means for cooling the cans after the application of the lacquer.

7. The combination with a cooker for cooking the contents of sealed cans, of a coating container arranged adjacent to the same, means for conveying the cans, while hot, from the cooker to the container, and means for maintaining the temperature of the coating below a predetermined point.

8. The combination with a cooker for cooking the contents of sealed cans, of a coating container arranged adjacent to the same, means for conveying the cans, while hot, from the cooker to the container and a water receptacle inclosing said container, whereby the temperature of the coating may be controlled.

In testimony whereof I affix my signature.

OTTO VOSS.